United States Patent [19]

Reneau

[11] 4,180,285  
[45] Dec. 25, 1979

[54] ARTICULATED BALL CONNECTOR FOR USE WITH PIPELINE

[76] Inventor: Bobby J. Reneau, P.O. Box 11625, Houston, Tex. 77016

[21] Appl. No.: 904,785

[22] Filed: May 11, 1978

[51] Int. Cl.² .......................................... F16L 27/04
[52] U.S. Cl. .................................. 285/261; 285/184; 285/276
[58] Field of Search .............. 285/272, 275, 276, 277, 285/278, 98, 184, 261, 321

[56] References Cited

U.S. PATENT DOCUMENTS

| | | | |
|---|---|---|---|
| 3,454,288 | 7/1969 | Mancusi, Jr. .......................... | 285/98 |
| 3,695,633 | 10/1972 | Hanes ................ | 285/261 X |
| 3,874,706 | 4/1975 | Arnold ................ | 285/184 |
| 3,944,263 | 3/1976 | Arnold ................ | 285/321 |
| 4,040,650 | 8/1977 | Shotbolt ............. | 285/184 X |
| 4,045,054 | 8/1977 | Arnold ................ | 285/184 X |

FOREIGN PATENT DOCUMENTS

| | | | |
|---|---|---|---|
| 846905 | 8/1960 | United Kingdom ..................... | 285/184 |
| 1077599 | 8/1967 | United Kingdom ..................... | 285/321 |

*Primary Examiner*—Mervin Stein  
*Assistant Examiner*—Carl Pietruszka  
*Attorney, Agent, or Firm*—Donald Gunn

[57] ABSTRACT

An improved articulated ball connector for use with pipelines as disclosed. In the illustrated embodiment, a sphere is attached to the end of a pipeline. A collar is fitted about the sphere. The collar has a surface contoured to match the surface of the sphere and its rotates or deflects through a designated angle. The collar has an encircling outer groove. A cup shaped receptacle receives the curved surface of the ball. The collar is abutted against a transverse shoulder on the cup shaped receptacle. The ball is pivoted relative to the cup shaped receptacle and the collar. A ring having a cross section which is U-shaped latches about the cup shaped receptacle and the collar. The U-shaped cross section includes upper and lower shoulders which protrude inwardly and engage the cup shaped receptacle and the groove in the collar. The ring is squeezed radially inwardly to clamp the cup shaped receptacle and the collar together. The ring is held at the radially inwardly directed position by means of a tapered wedge which fully encircles it and jams it inwardly. The tapered wedge is in the form of a hydraulically moved ring within a cylindrical housing.

7 Claims, 3 Drawing Figures

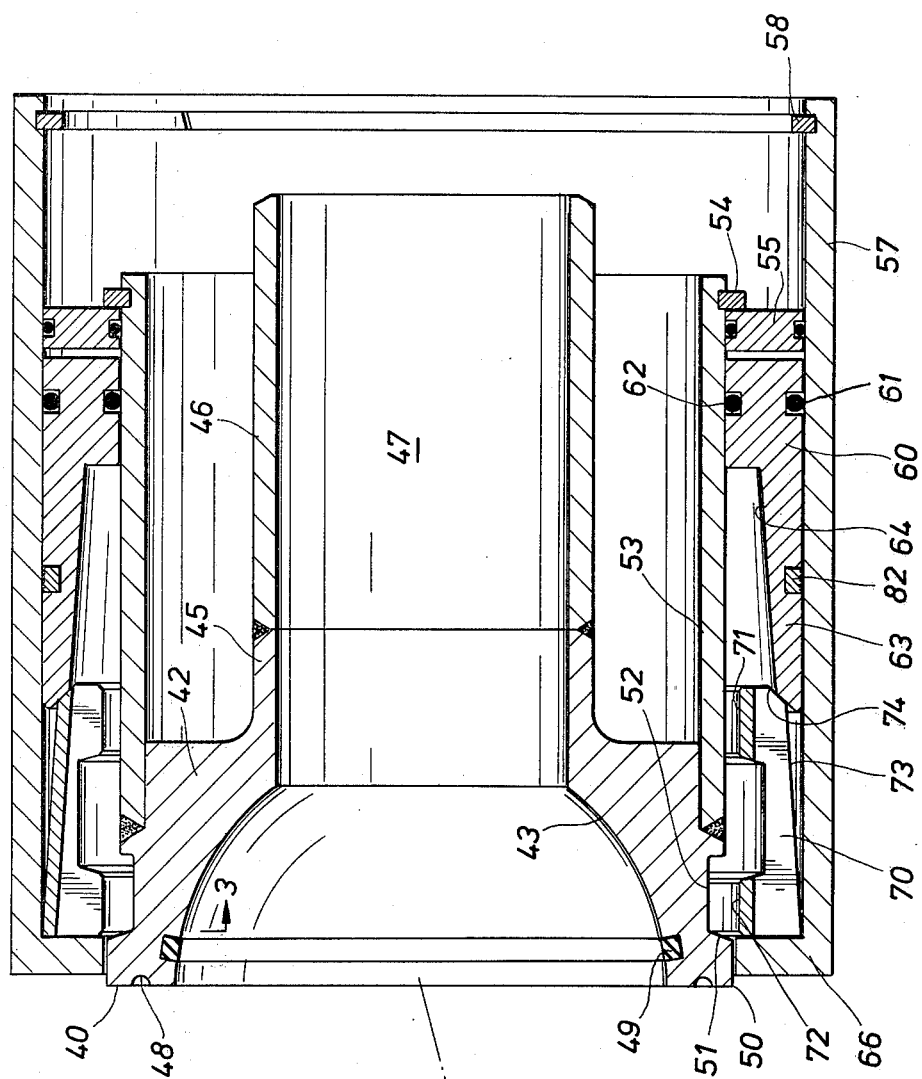
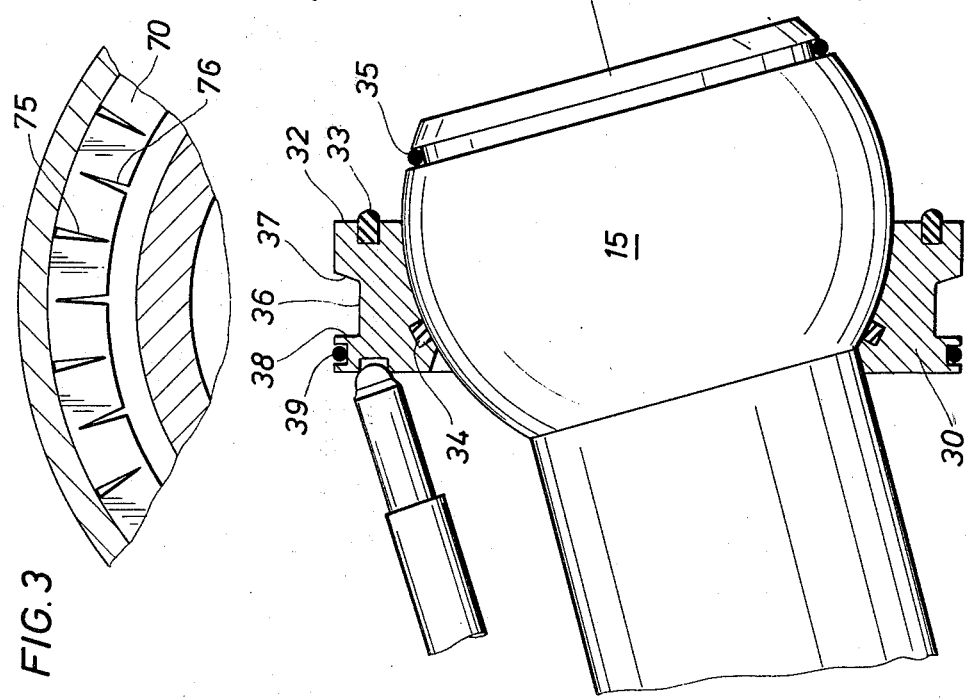
FIG.3
FIG.2

ARTICULATED BALL CONNECTOR FOR USE WITH PIPELINE

BACKGROUND OF THE INVENTION

This invention is directed to a quick connected coupling. It is adapted to connect first and second pipes together. The pipes to be connected are not necessarily required to align accurately. The present invention is adapted for use in connecting pipes together which are not aligned and which must be connected under adverse circumstances. The present invention is further advantageous in that the ultimate seal which is provided thereby is a metal to metal seal. The device includes a spherically constructed ball adapted to be appended at one end of the pipe while the mating device is a cup shaped receptacle. The cup does not encircle the ball presenting problems on stabbing the two together. Rather, the cup encloses only a portion of the ball so that the two parts can be brought quickly together. However, the ball carries a collar which, when abutted against the cup, defines an encompassing spherical receptacle which then holds the ball firmly.

The ball is thus clamped when the apparatus (installed in two parts) is brought together. When clamped, the sphere is fixed at a specific angle relative to the axis of the two pipes. Prior to fixation, The ball is free to pivot thereby enabling the angle to be varied to accommodate misalignment in the pipelines.

The apparatus is assembled without resort to nuts and bolts at the time of connection. This enables rapid connection. The apparatus is particularly able to be quickly connected together by the application of hydraulic fluid to it. It can be installed remotely and automatically without manual operation.

DESCRIPTION OF THE INVENTION

This invention is a quick connected coupling for use with pipelines. It is useful in connecting two joints of pipe together which are incorrectly aligned prior to assembly. On one of the pipes, a ball is appended. An axial passage provides flow through the ball. The ball has an outer surface which is a segment of a sphere. The outer surface supports a collar which has a face shaped to match the outer surface thereby enabling the collar to position itself at a planar location which intersects the axis of the pipe either perpendicular or at an offset angle. Moreover, it has an exposed radially extending face which carries a seal adapted to be contacted against cooperative apparatus.

The other half of the equipment utilizes a cup shaped receptacle attached to the end of a pipeline. The cup shaped receptacle is provided with a surface which mates with the outer surface of the ball. However, it does not extend so far as to fully enclose the ball and hence the two parts can be pulled apart easily. A concentric sleeve is positioned about the cup shaped receptacle. A larger concentric sleeve is located about the first sleeve. The two sleeves enclose a moveable ring which has a tapered wedge shaped ding edge. The tapered wedge shifts a locking ring radially inwardly and outwardly. The locking ring is notched or cut at numerous places to enable it to expand radially inwardly and outwardly easily. The tapered wedge rides over the outer surface of the locking ring and drives it inwardly. When it moves inwardly, an upward shoulder on it locks with a groove in the collar and the lower shoulder locks around the cup shape receptacle.

DESCRIPTION OF THE DRAWINGS

FIG. 2 is a sectional view similar to FIG. 1 showing the two portions of the equipment separated from one another; and FIG. 3 is a partial sectional view along the line 3—3 of FIG. 2 illustrating the stress relief cuts formed in the lock ring.

DESCRIPTION OF THE PREFERRED EMBODIMENT

Figure 1:
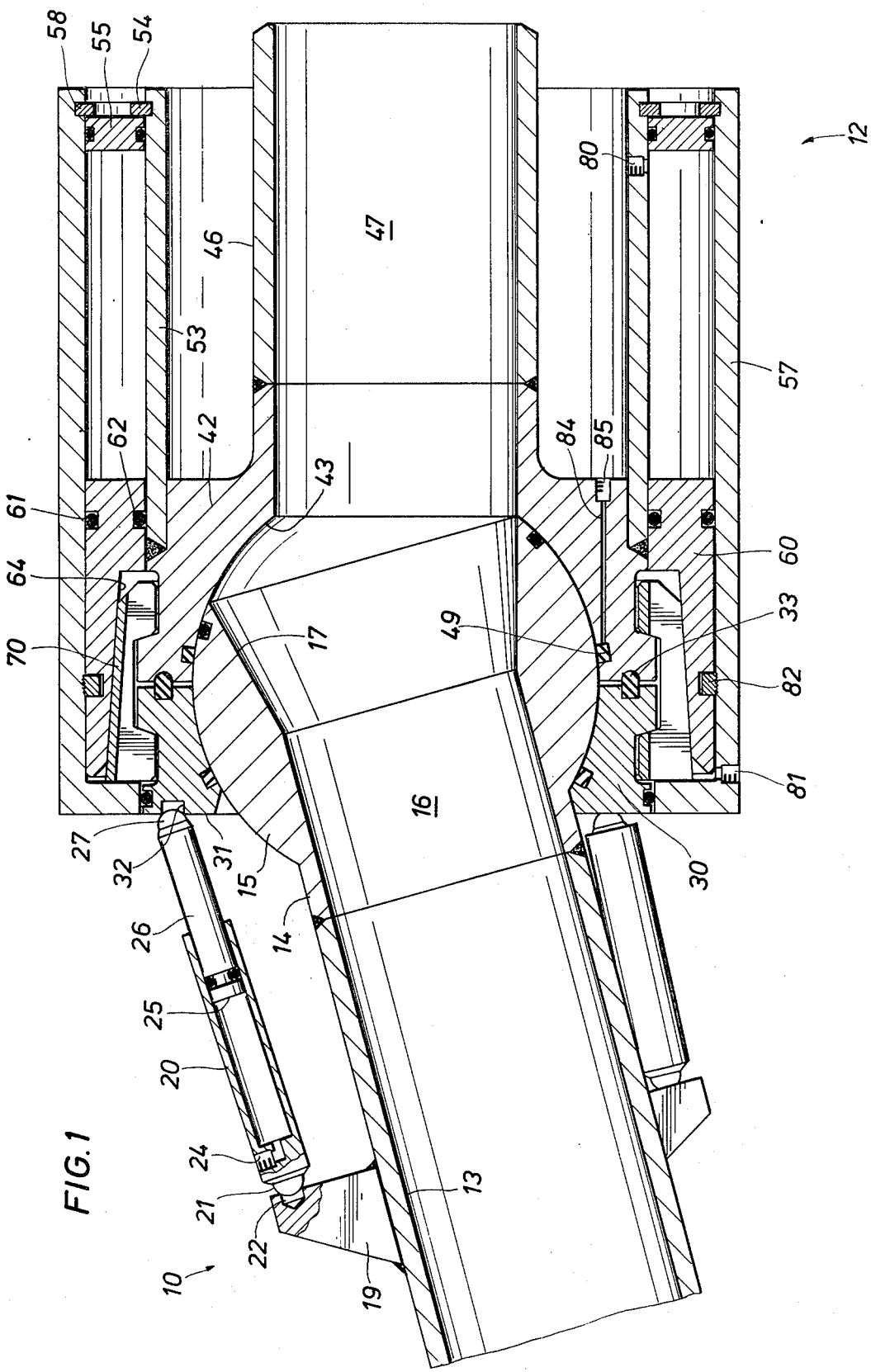
FIG. 1 is a sectional view of the two parts of the connective apparatus of the present invention particularly illustrating details of construction whereby a ball shaped member appended to one end of a pipe is captured within a cuplike receptacle on the mating equipment, the two portions comprising the entire assembly which is hydraulically actuated.

In FIG. 1 of the drawings the numeral 10 identifies the left hand apparatus while the numeral 12 identifies the right hand equipment. The apparatus of the left is appended to one pipe while the apparatus 12 is connected to another pipe. The apparatus 10 will be briefly described hereinafter as the ball connector and the apparatus 12 will be denoted as the socket connector.

A pipe 13 is illustrated. It is a short piece of pipe and adapted to be butt welded or otherwise connected in a pipeline. The pipe 13 connects with a short tubular member 14 which flares outwardly into a sphere 15. The sphere 15 has an axial passage 16 therethrough. The end of the passage 16 is flared into a bugle shaped outlet at 17. The external surface of the sphere or ball 15 is circular at any cross-section thereof. The external surface is smoothly finished preferably ground and lapped to a finish of about 4 to 8 RMS. The passage 16 provides a full bore opening through the ball 15. AT the enlarged end portion 17, it is greater than full bore. As will be observed in FIG. 1 however, this enables the sphere to connect quite nicely with the other pipe as will be described.

The pipe joint 13 has an encircling collar 19 about it. It supports a pivotly mounted cylinder 20. The cylinder at one end has a pivotal ball mounting 21. The ball 21 is received in a simple 22 drilled for that purpose in the fixed collar 19. Preferably, three identical cylinders are used. They are preferably evenly spaced around the pipe 13. The number can be varied from three; however, three is normally considered adequate.

The cylinder 20 has a single port 24. It has an internal cavity which is closed by a piston 25 which connects with a piston rod 26. The piston rod 26 has a pivot connector 27 at its remote end.

The apparatus includes a moveable collar 30. The collar 30 encircles the ball 15. The collar 30 has a mating internal surface which conforms with the spherical surface of the ball 15. The collar 30 is larger than the pipe 13 but is smaller than the maximum diameter of the ball 15. Thus, it can not fall away from the ball by passing over it. The ball limits the travel of the collar 30. The collar 30 has a rear face 31. The rear face 31 has small holes 32 formed therein to receive the circular pivot 27. The circular pivot 27 is rotatably positioned against the collar 31. This enables the hydraulic cylinder 20 to connect between the fixed collar 19 and the moveable collar. The moveable collar 30 tilts as shown in the drawings. It tilts through a specified angular range, limited by contact against the tubular member 14 It is shown at the extreme of movement in FIG. 1.

The several hydraulic cylinders 20 are preferably evenly spaced around the circumference of the pipe. They also preferably have equal fluid capacities. They have a common manifold line connected to each one. Thus, fluid pumped from one cylinder flows into the manifold line and into other cylinders. This arrangement enables the hydraulic cylinders to force the collar 30 against the ball 15 and maintain it against the ball. The cylinders collectively enable the collar 30 to tilt as shown in the drawings, for example, and they also enable it to be returned to a precise transverse position. On movement, fluid is pumped from a shortened hydraulic chamber into one of the longer chambers on the opposite side of the pipe.

The ring 30 is provided with an exposed transverse face 32 better shown in FIG. 2. The face 32 has a groove formed in it and receives a protruding resilient seal 33. In addition, leakage past the ring 30 is thus limited by a seal member 34. Another seal 35 is incorporated in the lower hemisphere of the ball 15. The collar 30 is formed with an external groove 36. The groove 36 is defined by a tapered face 37. The opposing face 38 cooperates to define the depth of groove. The numeral 39 identifies an externally located seal member. More will be noted concerning the groove 36 hereinafter.

The face 32 of the collar is approximately coincident with a diameter through the ball 15. It faces or confronts a matching face 40 which is formed on a cup like receptacle 42. The cup like member 42 has an internal surface 43 which is a portion of a sphere. It fits snuggly against the ball 15. The ball is provided with a lapped surface on the forward portions. The surface 43 and the face 32 of the collar 30 are both also quite smooth. This enables the equipment to achieve a metal to metal seal. While resilient seal members are incorporated a metal to metal seal avoids aging problems. A metal to metal seal thus can last indefinitely.

The receptacle 42 has an appended tubular stub 45. It is joined with a pipe 46. The two together designate an axial passage 47 which is preferably the same diameter of the passage 16 previously mentioned. The receptacle 42 has a shallow circular groove 48 which receives the seal member 33 protruding from the ring. The receptacle 42 is intergrally grooved to receive a seal 49 recessed in the groove.

The receptacle 42 has an outwardly extending lip 50. The lip 50 defines the back side of a shoulder 51. The shoulder 51 is adjacent to a shallow groove 52 formed on the outside of the receptacle member 53 which extends parallel to the pipe 46. The connection is achieved by a weld adjacent to the groove 52.

The tubular sleeve 53 has a lock ring 54 received in a shallow groove at its right hand end as viewed in FIG. 2. The ring 54 extends radially outwardly. It locks in position a ring 55. The ring 55 is provided on its inward and outward faces with appropriate o-ring seals. The seals define a leak proof joinder between the ring 55 and the tubular member 53.

A concentric tubular member 57 which is parallel to the tubular member 53 defines a space there between. The tubular member 57 has an internally located lock ring 58. The tubular member 57 is laterally moveable so that the lock ring 58 is brought to bear against the back side of the ring 55. The ring 55 of course also seals against tubular member 57.

The tubular members 53 and 57 are concentric and hence define a hydraulic cavity between them. The ring 55 closes the cavity at one end. A piston 60 is received in this cavity. The piston itself is a ring like member. It is provided with appropriate seals 61 and 62 which prevent leakage past the piston. The piston thus has a width which spans the gap between the concentric members, and hence, fluid pressure applied between the ring 55 and piston 60 forces the piston to the left as viewed in FIG. 2. The piston has an elongated tapered skirt portion 63. The elongated tapered skirt portion 63 has a tapered internal face 64 for purposes to be described.

The tubular member 57 terminates at an inwardly directed shoulder 66 shown in FIG. 2. This enables it to capture a lock ring 70. The lock ring is shown in the sectional view in FIG. 2. It will be observed to be somewhat U-shaped. In particular, it includes an inwardly protruding shoulder portion 71. A similar shoulder portion 72 is arranged at the other end. The shoulder portion 71 is sized to fit into the shallow groove 52. The shoulder 72 is sized to fit into the groove 36. The shoulders 71 and 72 have tapered faces. This enables them to be inserted smoothly into the grooves 52 and 36 respectively.

The back face 73 of the lock ring 70 is tapered. Preferably, it tapers at an angle matching the tapered face 64. The corner 74 is chamfered. The chamfered corner enables the tapered skirt 63 to ride over the lock ring 70.

The lock ring 70 must expand radially inwardly when the wedge 63 is pushed to an encircling position adjacent to the ring. To this end, the ring 70 is split. The splits do not extend all the way through the ring. Rather, fairly deep notches 75 and 76 are formed in the ring as shown in FIG. 3. The notches are alternated around the ring. The notches enable the ring to expand and contract. The ring is in its expanded state as shown in FIG. 2. When it is forced inwardly, it shrinks in circumference, thereby obtaining reduction in size at the notches 75 and 76. The notches 75 and 76 are alternated and extend through about 80 or 90 percent of the depth of the ring. The sectional view of FIG. 2 is taken through a notch so that only the tips of the shoulders 71 and 72 are shown in sectional view at the bottom of FIG. 2 while at the top of FIG. 2, the opposite is true.

In operation, the device functions in the following manner: the two components are attached to the ends of the pipes. The left portion 10 is moved toward the right portion 12. The moveable collar 30 is at any angle, supported at that angle by the hydraulic cylinders 20. The ball 15 is brought near the cup-like receptacle 42. It is forced into the receptacle. It is pushed into the receptacle until the collar 30 comes into contact with the exposed face 40. At this juncture, presume that the collar 30 is not parallel to the face 40. The collar 30 is pushed until the face 32 is approximately parallel to and in contact with the face 40. Such movement requires certain of the hydraulic cylinders 40 to retract, and other hydraulic cylinders to extend. The retraction and extention is achieved simultaneously by exchanging fluid from one to the other, all of them being connected in parallel on a common external manifold. In fact, one serves as a pump forcing another to extend. This readjusts the angular position of the ring or collar 30 bringing it to the position which is in contact with the surface of the sphere 15 and yet parallel to the exposed face 40.

The ball 15 is then seated in the receptacle 42. The opposing faces 32 and 40 position the seal 33 in the encircling groove 48.

It will be observed that the moveable ring 30 covers what might be termed the back hemisphere of the ball 15. The receptacle 42 of course works against the front spherical surface of the ball 15. However, it does not enclose more than a hemisphere to easily permit insertion of the ball. After the ball has been inserted, metal to metal contact is achieved between the ball and the receptacle 42. This provides the long lived seal (in the form of a lapped surface) which prevents leakage indefinitely.

Attention is then directed to FIG. 1. In FIG. 1, fluid under pressure is admitted to a fitting at 80. The equipment is originally in the position shown in FIG. 2. Fluid admitted through the fitting 80 forces the piston 60 to the left. As it travels to the left, the tubular member 57 is forced to the left. The two motions are achieved somewhat simultaneously. Movement of the piston 60 to the left is resisted by the split lock ring 70. With the components in the initial position shown in FIG. 2, the piston 60, the ring 70, and the tubular member 57 move together as a unit. However, the movement of the three components together is limited when the lock ring 58 encounters the circular cylinder head 55. At this juncture, the tubular member 57 is held in the position of FIG. 1. The piston 60 however, continues to move to the left as more pressure fluid is introduced. As more fluid is introduced, the tapered face 64 of the piston 60 drives to the exterior of the lock ring 70. The lock ring 70 is at that juncture transfered to the far left of its extremity of movement (that shown of FIG. 1) and then begins to shrink inwardly. As it shrinks inwardly, the protruding shoulder portions 71 and 72 on its inner face are forced into the mating grooves 52 and 36 respectively shown in the drawings. Up to this juncture, the pipe supporting the ball 15 is free to pull away. However, as the lock ring 70 shrinks, the two protruding shoulders lock the ring 30 and the receptacle 42, thereby joining the two together. The lock ring is forced home into the two grooves and the piston 60 achieves its maximum leftward movement.

At this juncture, the portions 10 and 12 are firmly held together. This completes the connection. It will be observed that an opening 81 is provided in FIG. 1 to introduce pressure fluid to force the piston 60 back to its original position. When this occurs, the lock ring 70 is free to expand and release the connection achieved by the equipment. The apparatus includes an optional ratchet mechanism 82. An expandable C-shaped ring having serrations on the outer surface can be incorporated in a groove formed in the piston 60. The tubular member 57 is thus provided with a set of mating serrations which serve as teeth. The two sets of serrations lock when brought together. They enable ratchet action as might occure when the serrations are riding over one another on movement of the piston to the left but lock against movement to the right. This can be optionally included or omitted as desired.

It is particularly important to note the incoporation of the several rubber seal members. These of course enhance the ability of the apparatus to make a seal. However, the metal to metal contact lasts indefinitely. This then means the equipment can be left without fear of deterioration with time of the seal materials. The resilient seals thus might fail and yet the connector would continue to function and operate.

Periodic inspection of the equipment may be necessary. To this end, the seal ring 49 serves as a good point which inspections can be taken. Leakage along the face of the spherical ball 15 is accumulated in the seal ring 49 and behind it. A pilot passage 84 is formed and communicates with a tapped port 85. The port 85 can be plugged or closed; alternately, it can be periodically opened to test for leakage.

The apparatus of the present invention is particularly useful in achieving connection without perfect alignment thus removing all strain from the pipeline. The ball 15 need only be positioned in the cup-like receptacle 42 to achieve the necessary connection. The ring 30 settles at the required position. This position is achieved at the time of connection together. After the locking mechanism has been fully operated, the desired angle is achieved. The angle is limited to about 15 or 20 degrees from perfect axial alignment.

The foregoing is directed to the preferred embodiment but the scope is determined by the claims.

I claim:

1. An apparatus for connecting two pipes together, comprising:
   (a) a spherical ball having an axial passage therethrough and adapted to be joined in fluid communication with a first pipe;
   (b) a receptacle means having an axial passage therethrough and formed of a female cavity having a surface matching that of said ball which surface is less than a hemisphere and which encircles said ball by at least 180 degrees, said receptacle means adapted to be joined in fluid communication with a second pipe;
   (c) clamping means for holding said ball in said receptacle means and aligning the axial passages thereof to enable fluid communication between the first and second pipes;
   (d) said clamping means securing said ball in said receptacle means by clamping said ball on its outer surface at a location on said ball on the exposed side opposite the hemisphere in said receptacle means and wherein said clamping means includes:
      (1) a circular first ring around said ball having a diameter enabling it to contact said ball without passing over said ball;
      (2) an external protruding lip on said receptacle means; and
      (3) means for locking said ring to said lip wherein said locking means comprises
      (4) an encircling second ring having a pair of spaced, internally directed shoulders which are spaced to encircle and abut said first ring and said lip in a side-by-side relationship.

2. The apparatus of claim 1 wherein said first ring around said ball includes an external groove, and one of said shoulders fits within said groove.

3. The apparatus of claim 1 wherein said lip on said receptacle means is provided with a shoulder thereon abutting one of said shoulders on said second ring.

4. The apparatus of claim 1 wherein said clamping means further comprises:
   (a) hydraulic cylinder means;
   (b) piston means in said cylinder means;
   (c) piston rod means connected to said piston means; and
   (d) first means connected to said piston rod means, said first means moving said first ring to a position contacting said ball opposite said receptacle.

5. An apparatus for connecting two pipes together, comprising:
   (a) a spherical ball having an axial passage therethrough and adapted to be joined in fluid communication with a first pipe;
   (b) a receptacle means having an axial passage therethrough and formed of a female cavity having a surface matching that of said ball which surface is less than a hemisphere and which encircles said ball by at least 180 degrees, said receptacle means adapted to be joined in fluid communication with a second pipe;
   (c) clamping means for holding said ball in said receptacle means and aligning the axial passages thereof to enable fluid communication between the first and second pipes;
   (d) said clamping means securing said ball in said receptacle means by clamping said ball on its outer surface at a location on said ball on the exposed side opposite the hemisphere in said receptacle means;
   (e) wherein said ball is spherical and is symmetrically centered about the axial passage therethrough;
   (f) said receptacle means having a spherical cavity which contacts a portion of said ball and enables said ball to rotate about its center to accommodate misalignment of the first and second pipes;
   (g) a tubular member concentric about the second pipe connected to said receptacle means;
   (h) a second, larger tubular member concentric about the first concentric tubular member;
   (i) a piston snugly received in the space between said first and second tubular members;
   (j) means closing off the space adjacent to said piston for introducing pressure fluid against one side of said piston for forcing said piston toward said ball and said receptacle means;
   (k) an appended, tapered sideskirt attached to said piston and directed toward said ball;
   (l) an expandable ring having first and second diameters, said second diameter being smaller than the first diameter, and said ring being provided with a tapered, exterior surface and which slidably fits within said skirt and which shrinks from the first to the second diameter;
   (m) first and second parallel shoulders on said ring protruding inwardly;
   (n) a floating and encircling ring which comprises a portion of said clamping means and is around said ball and contacting the back side thereof as defined by a diameter of said ball wherein said receptacle means is unable to pass over the diameter and wherein said floating ring is also unable to pass over the diameter of said ball;
   (o) an exposed groove in said floating ring on the exterior and a surface conforming with said ball to enable said floating ring to seat on said ball and by so doing define a plane perpendicular to the axial passage therethrough and which ring moves to angles other than the perpendicular angle;
   (p) said groove receiving one of said shoulders on said ring therein;
   (g) an external lip around said receptacle means which is grasped by the remaining of said shoulders to secure said floating ring adjacent to said receptacle means, said shoulders tapering to wedge said rings toward one another and said shoulders further locking said ball in a fixed position relative to said receptacle means; and
   (r) means for positioning said floating ring against said ball.

6. The apparatus of claim 5 wherein said last named means includes at least three hydraulic cylinders spaced around said floating ring and anchored relative to said ring, each being connected to said ring by a piston rod, said rods collectively extending and retracting to hold said floating ring against said ball at angles which vary dependent on the operation of said hydraulic cylinders.

7. The apparatus of claim 6 including a cylinder head between said first and second tubular members which comprises a portion of said closing means.

* * * * *

Notice of Adverse Decision in Interference

In Interference No. 101,007, involving Patent No. 4,180,285, B. J. Reneau, ARTICULATED BALL CONNECTOR FOR USE WITH PIPELINE, final judgment adverse to the patentee was rendered Feb. 1, 1984, as to claim 4.

[*Official Gazette June 5, 1984.*]